(12) United States Patent
Kataoka et al.

(10) Patent No.: US 8,325,574 B2
(45) Date of Patent: Dec. 4, 2012

(54) OPTICAL DISC DEVICE

(75) Inventors: Takeyoshi Kataoka, Yokohama (JP);
Seiji Imagawa, Yokohama (JP);
Munehiro Yonezawa, Tokyo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 289 days.

(21) Appl. No.: 12/336,555

(22) Filed: Dec. 17, 2008

(65) Prior Publication Data
US 2009/0207708 A1    Aug. 20, 2009

(30) Foreign Application Priority Data

Feb. 20, 2008  (JP) ................................. 2008-038170

(51) Int. Cl.
*G11B 7/00* (2006.01)
(52) U.S. Cl. ............... 369/47.39; 369/53.14; 369/53.28; 369/53.3
(58) Field of Classification Search .................... None
See application file for complete search history.

(56) References Cited

U.S. PATENT DOCUMENTS

| 7,843,775 B2 * | 11/2010 | Park et al. ................. 369/44.25 |
| 2004/0085668 A1 * | 5/2004 | Sakamoto ................. 360/73.03 |
| 2005/0162999 A1 * | 7/2005 | Yamashita ................. 369/44.34 |

FOREIGN PATENT DOCUMENTS

| JP | 08-265960 | 10/1996 |
| JP | 09-147392 | 6/1997 |
| JP | 11-213407 | 8/1999 |
| JP | 2003-157547 | 5/2003 |
| JP | 2005-222640 | 8/2005 |

OTHER PUBLICATIONS

Machine translation of JP 09-147392A into English; Kusano et al.*

* cited by examiner

*Primary Examiner* — Wayne Young
*Assistant Examiner* — Brian Butcher
(74) *Attorney, Agent, or Firm* — Antonelli, Terry, Stout & Kraus, LLP.

(57) ABSTRACT

An optical disc device capable of preventing a current larger than prescribed in specifications from flowing by measuring amounts of variation in drive signals of the actuator or the spindle motor, and in view of a correlation between those amounts of variation in the drive signals and the amount of current, changing the servo control system characteristics according to measured amounts of variation, and setting a limit to the level of drive signals.

18 Claims, 6 Drawing Sheets

OPTICAL DISC DEVICE

INCORPORATION BY REFERENCE

This application claims the benefits of priority of Japanese Application No. 2008-038170 Filed Feb. 20, 2008 the disclosure of which also is entirely incorporated herein by reference.

BACKGROUND OF THE INVENTION

The present invention relates to an optical disc device configured to control a motor or an actuator.

A drive device, such as actuator, mounted on a disc device can drive the disc device at a higher speed when a larger drive current is applied. On the other hand, if the drive current is increased too high, chances of failure will increase.

As a related art, JP-A-8-265960 discloses "detecting an overcurrent corresponding to temperature by comparing between a drive current supplied to the actuator from the driver and a limit current changed according to the temperature, and then detecting that the drive current to the actuator has exceeded the limit current."

SUMMARY OF THE INVENTION

As the transfer speed of optical discs follows a trend of multiple times speed up, their rotating speed is increasing rapidly. As a result, the amount of current to drive the spindle motor is increasing. The actuator, which moves the objective lens of the optical pickup to collect laser light, has come to need to respond to faster motions. To this end, a wide frequency band width has been secured for servo control, which contributes to an increase in the amount of current.

When an optical disc is of poor quality, a reflected light from the optical disc contains various kinds of noise. Thus, noise reflected in the drive signal supplied to the actuator increases the amount of current. The wider the frequency band is secured for servo control, the more the amount of current increased by noise becomes large.

The optical disc device with the overcurrent detecting unit described in JP-A-8-265960 temporarily stops the incoming current when it detects an overcurrent. In this case, however, it is necessary to temporarily stop recording or reproducing on the disc. Even though the operation is stopped temporarily, if recording or reproducing takes place on the disc while noise is occurring, the optical disc device will immediately detect an overcurrent and stop. Particularly when the optical disc device is of inferior quality and a large amount of drive current continues to occur, chances are that reproduction cannot be continued regardless of the level of temperature detected.

The present invention therefore has a task of making it possible to continue reproduction while reducing the possibility for failure of the actuator which results from an increase in the drive current.

The above task can be achieved, for example, by the inventions set forth in the appended claims. An example of the means used will be described below.

The optical disc device changes servo-control characteristics according to amounts of variation in a focus drive signal and/or a tracking drive signal each output from a control means to drive the actuator. In this manner, an increase in the range of variation in the actuator drive signals is suppressed. The servo-control characteristics may be changed not only by drive signals but also based on signals generated from a reflected light.

The optical disc device changes output characteristics of a spindle drive signal according to an amount of variation in a spindle motor drive signal.

BRIEF DESCRIPTION OF THE DRAWINGS

These and other features, objects and advantages of the present invention will become more apparent from the following description when taken in conjunction with the accompanying drawings wherein.

DESCRIPTION OF THE INVENTION

First Embodiment

Figure 1:
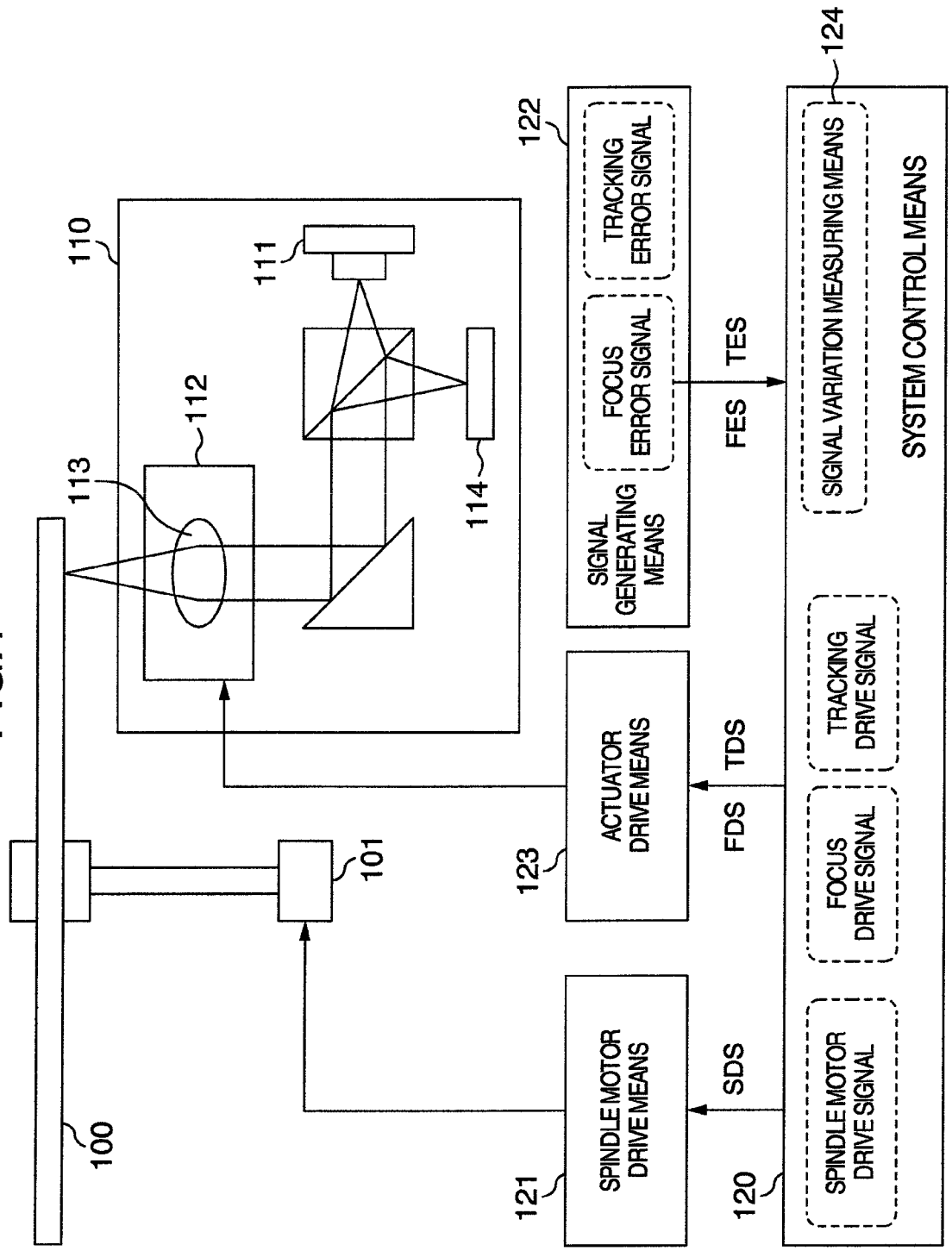
FIG. 1 is a block diagram showing an optical disc device.

FIG. 1 is a block diagram showing the configuration of an optical disc device.

An optical disc 100 is read, written or erased by emitting a laser beam from an optical pickup 110, and the disc is rotated by a spindle motor 101 driven by a spindle drive means 121, which responds to a spindle motor drive signal (SDS) output from the a system control means 120.

Laser light emitted from the laser light source 111 is condensed as a light spot on the information recording surface of the optical disc 100 by an objective lens 113 moved by the actuator 112. A laser beam in a condensed light spot is reflected on the information recording surface of the optical disc 100, and detected by a light detector 114. From a signal detected by the light detector 114, the signal generating means 122 generates a focus error signal (FES) and a tracking error signal (TES).

Out of signals input to a system control means 120, a focus error signal is read as a signal representing an amount of error between the light spot and the information recording surface. Out of the signals input to the system control means 120, a tracking error signal is read as a signal representing an amount of error in radial direction between the light spot and pits or a track provided in spiral form on the recording layer of the optical disc.

The actuator 112 is driven by an actuator drive means 123 which responds to a focus drive signal (FDS) to move the actuator in the focus direction and a tracking drive signal (TDS) to move the actuator in the radial direction. Both of the drive signals are output from the system control means 120. This actuator 112 moves the objective lens 113 in the radial direction and the focus direction of the optical disc 100. The system control means 120 incorporates a signal variation amount measuring means 124 that measure amounts of variation of the two drive signals.

Figure 2:
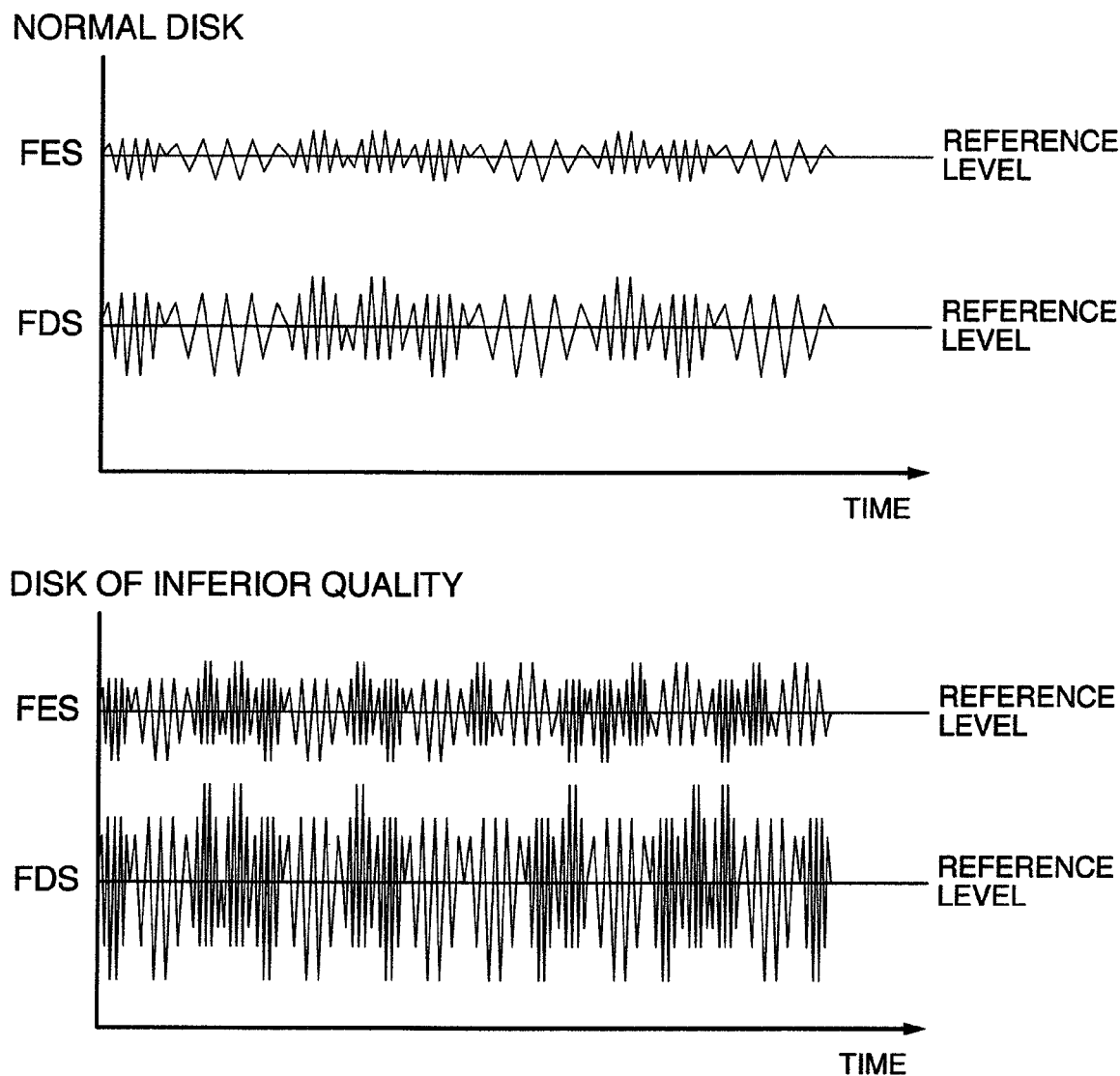
FIG. 2 is a diagram showing signal waveforms on a normal disc and a poor-quality disc.

FIG. 2 shows diagrams showing the behavior of a focus error signal and a focus drive signal, respectively, on a normal optical disc and on a poor-quality disc, the latter exhibits a reflected light containing noise, when an optical disc is being reproduced.

Compared with the normal disc, in the poor-quality disc, the amount of variation of the focus error signal is large owing to noise in the reflected light, and therefore the amount of variation of the focus drive signal is also large, which is generated by passing the focus error signal through a filter. The increase of the focus drive signal causes an increase in the amount of current flowing in the actuator 112, thus increasing the risk of breakdown of the actuator.

Figure 3:
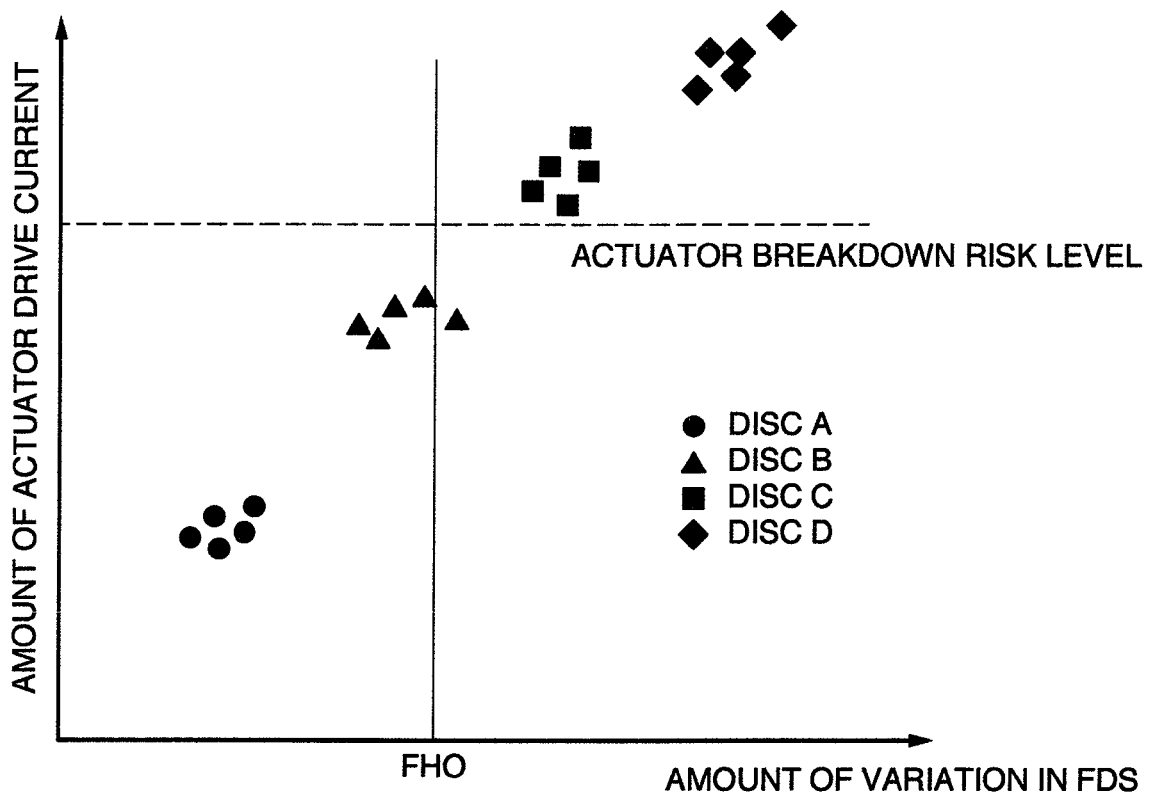
FIG. 3 is a diagram showing a relation between amounts of variation in spindle motor drive signal and amounts of drive current.

FIG. 3 concerns a focus servo control system, and illustrates a relation between measured amounts by the signal variation amount measuring means 124 and amounts of current flowing in the actuator 112 after the optical disc 100 has rotated for a few rotations. The dots plotted in FIG. 3 represent the values obtained after the characteristics of a focus servo control system and a tracking servo control system with respect to the information recording surface of the optical disc 100 were adjusted and when the respective servo control systems were in operation. FIG. 3 shows results after several kinds of optical discs were set and ejected several times, and an initializing operation, such as a set-up process was performed more than once.

If the amount of current flowing in the actuator 112 increases, a measured value of amount of variation also increases. Disc A has a relatively small amount of current, so it has a small measured value of the amount of variation. Discs B and C have large amounts of current and their actuators are at risk of breakdown. Therefore, the servo control characteristics of discs B and C are changed to suppress their amounts of current. Let a reference for separating discs A, B and C be FH0. Disc D sometimes exceeds FH0 and sometimes does not exceed FH0, but neither case results in the actuator breakdown current being exceeded. It is desirable that FH0 should be set with some allowance with respect to a dangerous amount of current.

Figure 4:
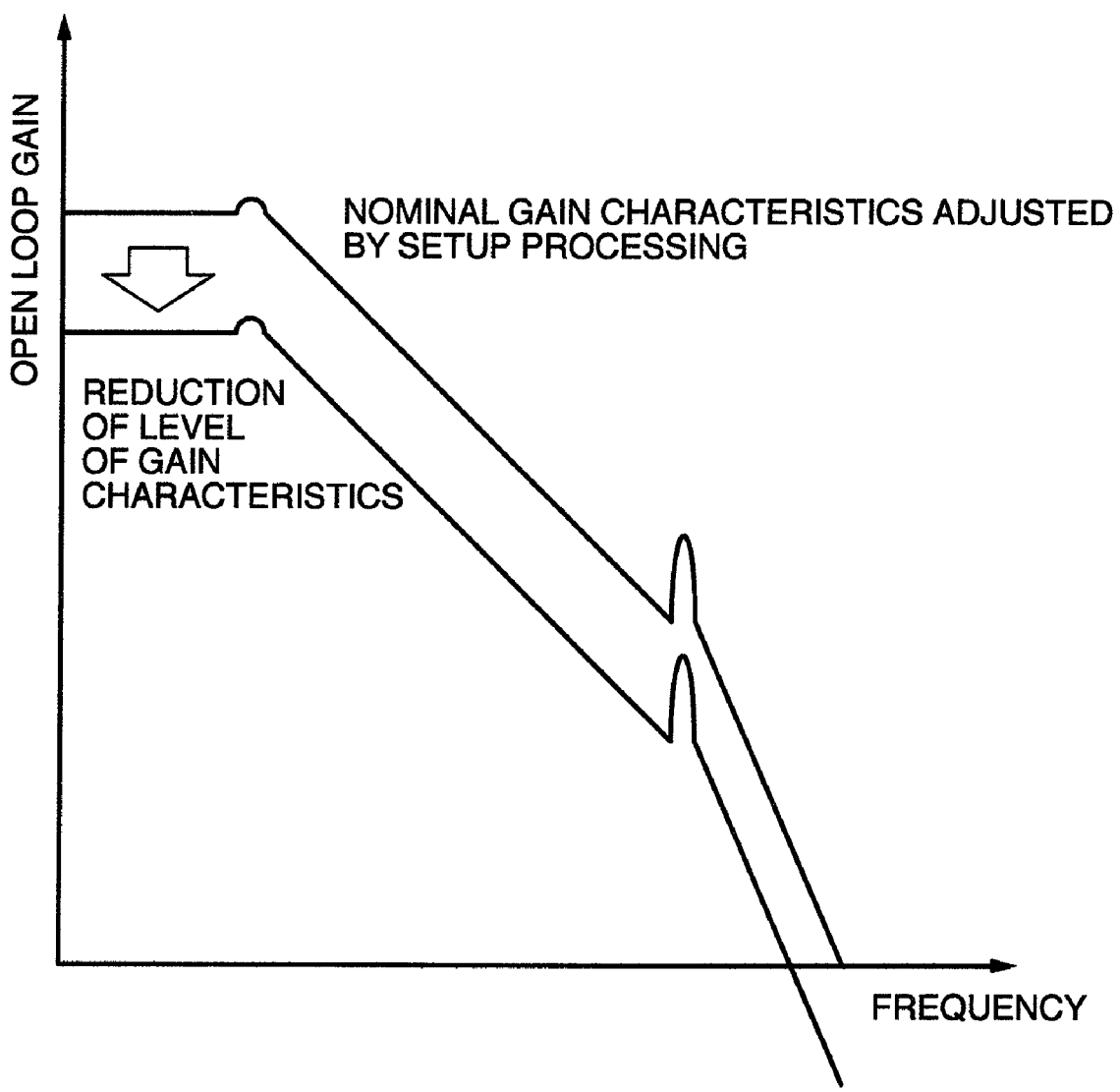
FIG. 4 is a servo control characteristic diagram.

Changing characteristics of servo control performed on an optical disc which has a measured value of variation amount of FH0 or more means to change the servo control characteristics in such a way as to suppress an amount of variation in actuator drive signals, namely a focus drive signal and a tracking drive signal. FIG. 4 shows an example of modification to the servo control characteristics. The amounts of variation in the actuator drive signal in the servo control system open-loop gain characteristics can be decreased by reducing the same amount of gain at every point of the original curve of the characteristics.

Figure 5:
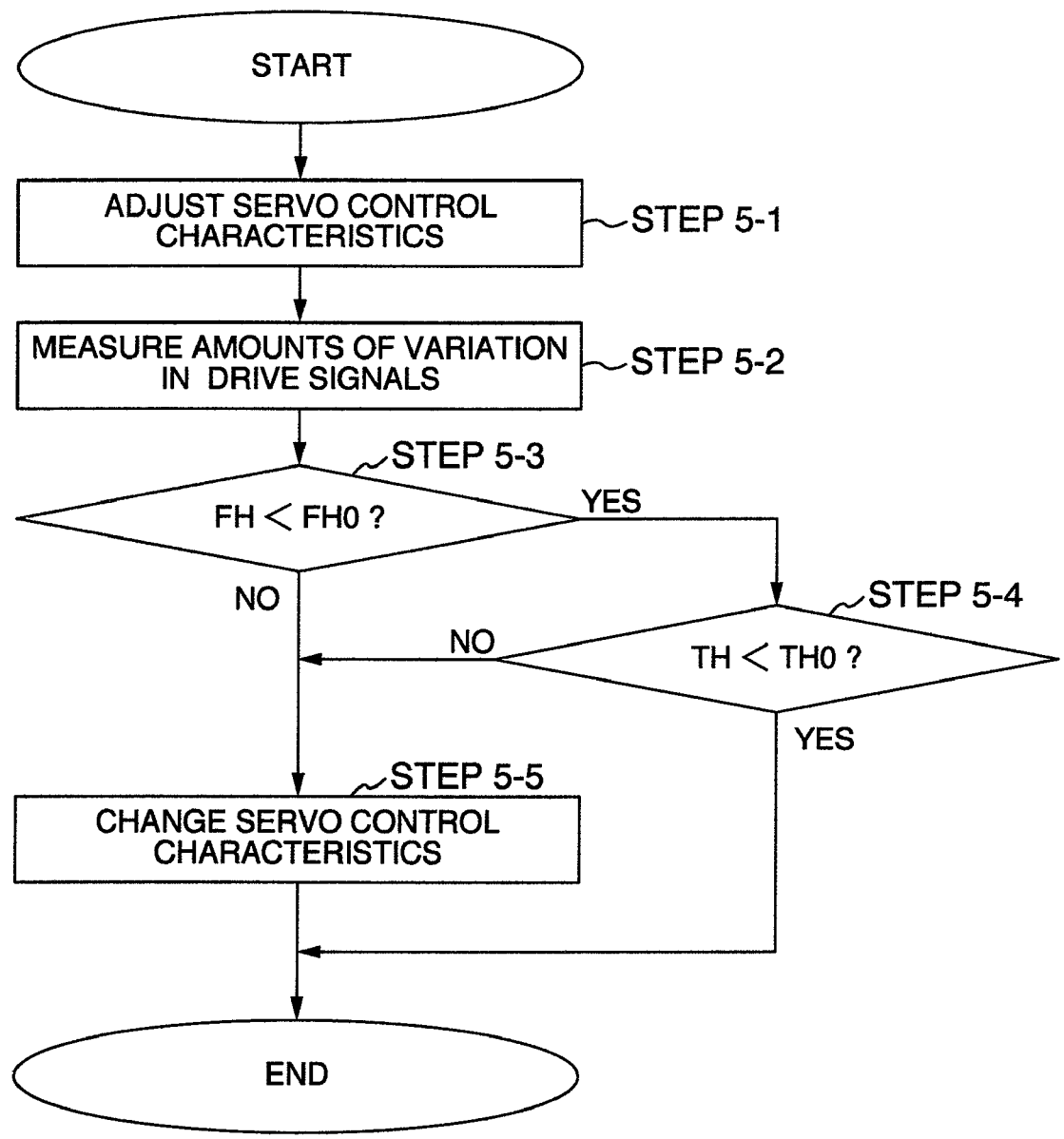
FIG. 5 is a flowchart.

FIG. 5 is a flowchart of this embodiment of the present invention.

When an optical disc is set in the optical disc device, or when an optical disc device, in which an optical disc is set, is started, an initializing operation, such as a set-up process and a loading process, is performed.

In the above set-up process, the system control means 120 adjusts the servo control characteristics to obtain a desired control frequency band width (step 5-1).

Then, the system control means 120 measures amounts of variation in actuator drive signals (step 5-2). The system control means 120 determines whether or not a measured value of an amount of variation in the focus drive signal FH is smaller than the reference FH0 of the focus servo control system (step 5-3). If the result of step 5-3 is Yes, the system control means 120 determines whether or not a measured value of an amount of variation in the tracking drive signal TH is smaller than the reference TH0 of the tracking control system (step 5-4). If the result of step 5-4 is Yes, the system control means 120 finishes the process according to the servo control characteristics adjusted in step 5-1. It the results in step 5-3 and step 5-4 are No, the system control means 120 finishes the process by changing the servo control characteristics, and reducing the amount of current (step 5-5).

In this case, in step 5-5, the system control means 120 changes the servo control characteristics of both the focus servo control system and the tracking servo control system.

An example of a method of calculating an amount of variation in step 5-2 is described. For example, levels of each drive signal are measured at a fixed clock, and differences between measured levels and the reference level are obtained. An mount of variation of a drive signal is obtained by sequentially adding up the absolute values of differences or squared values of differences, or integrating the values of differences. Or, this amount of variation is obtained, for example, by sequentially adding up or integrating differences between maximum and minimum values of the oscillation of a drive signal. Furthermore, the amount of variation is obtained, for example, by applying the above-described method of calculation to drive signals obtained while the disc device rotates the disc several revolutions. When an amount of variation is calculated, a drive signal for one rotation or two rotations of the disc may be used, but these numbers are shown not for limitative purposes. The method for calculating amounts of variation may be configured that the measured amounts are calculated based on a drive signal obtained in a fixed period of time.

In step 5-5, for changing the characteristics of the focus servo control system and the tracking servo control system, there is a method which changes characteristics of only the control system where an amount of variation has exceeded a reference level. More specifically, if an amount of variation in a focus drive signal exceeds a reference value, the amounts of characteristics of the focus servo control system can be changed, or if an amount of variation in a tracking drive signal exceeds a reference value, the amounts of characteristics of the tracking servo control system can be changed. In this case, it is desirable to proceed to a decision process to determine whether or not an amount of variation of a tracking drive signal TH has exceeded a reference value TH0 in step 5-4 regardless of a result of whether or not an amount of variation of a focus drive signal FH has exceeded a reference value TH0 in step 5-3 to avoid executing only one of the two steps.

In this flowchart, decisions are made separately about an amount of variation of a focus drive signal and about an amount of variation of a tracking actuator drive signal, but a sum of absolute values of differences or a sum of squared values of differences as results of measurement of two different amounts of variation may be used as a factor for making a decision about whether or not to change the characteristics. In this case, step 5-3 and step 5-4 are combined.

The method of calculating amounts of variation may be configured to change servo characteristics based not on an amount of variation in the actuator drive signal, but on amounts of variation in the focus error signal and the tracking error signal.

As shown in FIG. 4, if the gain level of the servo control system open-loop gain characteristics is decreased to reduce the amount of current, this leads to lowering of the servo control performance for rotation at high speed. For this reason, the method of calculating amounts of variation may be configured to accommodate a decrease in the servo control performance by decreasing the gain level, and reducing the rotating speed of the optical disc 100. In this case, however, the transfer rate of information drops.

Even when an optical disc 100 has a large amount of eccentricity, the amount of variation is large. However, it is sometimes better not to change the servo control performance of such an optical disc. Therefore, there is a method in which when the amount of eccentricity of an optical disc 100 is more than a certain amount, the servo control performance is not changed, but when the amount of eccentricity is not more than a certain amount, the servo control performance is changed. This method can be realized by providing, before step 5-1, a decision step with respect to the eccentricity, and if the amount of eccentricity is not more than a certain amount, the process of this embodiment is performed.

In this embodiment, amounts of variation of actuator drive signals are used as a factor for decision, but if an amount of current can be measured directly, this amount of current may be used as a factor for decision.

In this embodiment, description has been made of a process in which the gain level in the servo control open-loop gain characteristics is reduced when an amount of variation is large, but the gain level in the servo control open-loop gain characteristics may be raised when an amount of variation is small.

Second Embodiment

An optical disc device in a second embodiment has the same structure as in the first embodiment shown in the block diagram of FIG. 1.

An optical disc is rotated by a spindle motor 101 driven by a spindle motor drive means 121, which responds to a spindle motor drive signal (SDS) output from a system control means 120.

Figure 6:
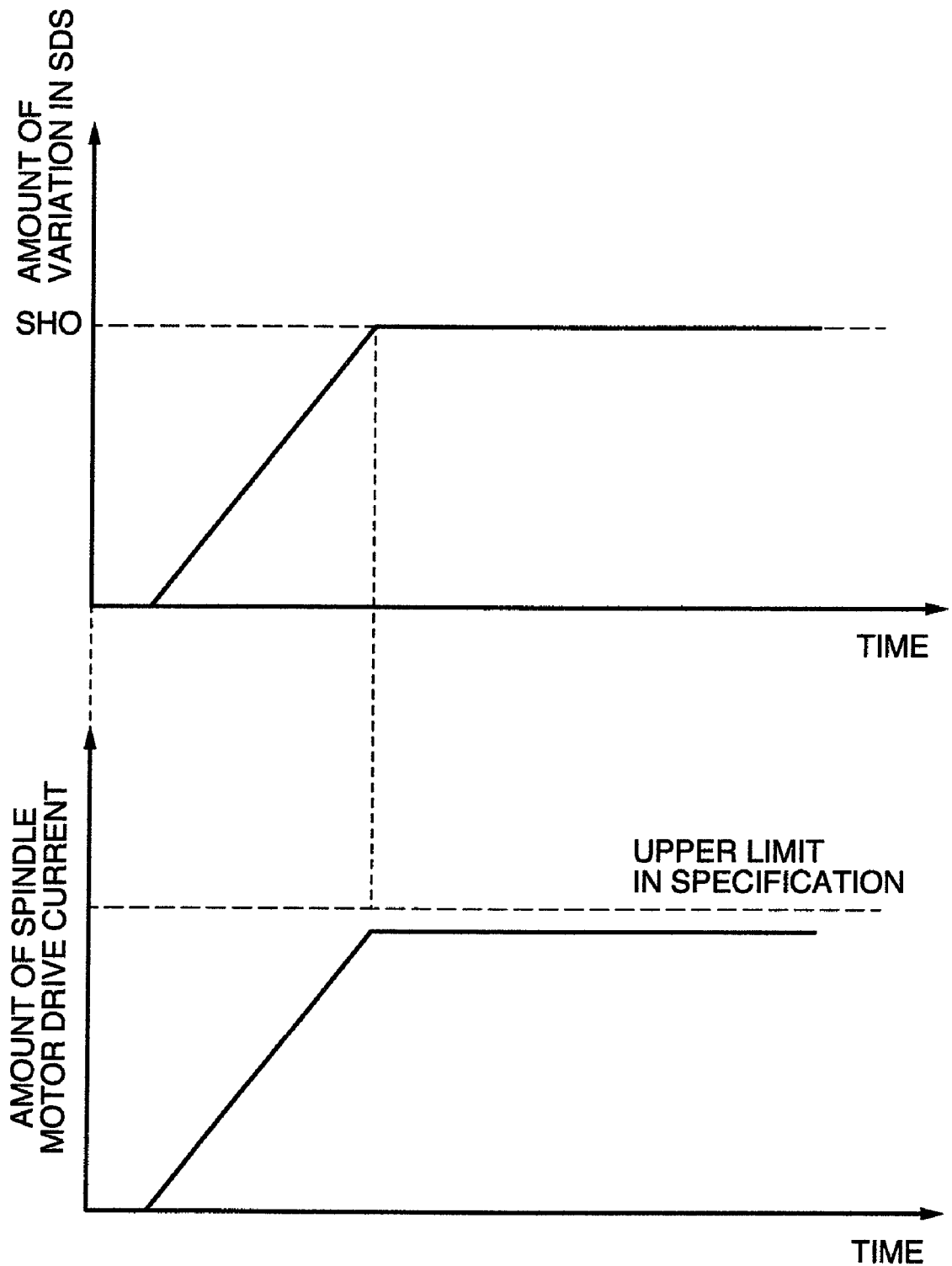
FIG. 6 is a diagram for explaining amounts of variation in spindle drive signal (SDS) and amounts of spindle motor drive current.

FIG. 6 illustrates a method of preventing a spindle motor drive current from surpassing the maximum level of specifications by using an amount of variation in a spindle motor drive signal. When a spindle motor drive signal output is increased to raise the rotating speed of the spindle motor, the amount of current also increases. Simultaneously, the amount of variation in the spindle motor drive signal increases. The amount of variation when the spindle motor drive current goes up to a level a little lower than a limit value prescribed in specifications is designated as a reference level SH0. When the amount of variation of the spindle motor drive signal reaches the SH0, the spindle drive signal is prevented from increasing any more, and the spindle rotating speed is made to reach a desired speed by a torque produced by this spindle drive current.

According to the optical disc device in both embodiments described, after an optical disc is inserted into the optical disc device, in the set-up process, a time is secured for a drive signal to be supplied until the optical disc has rotated for a few rotations. In this manner, a possibility of actuator breakdown due to overcurrent can be eliminated, so that after recording or reproduction is started subsequent to the set-up process, the possibility of operation stoppage caused by overcurrent can be suppressed. In the spindle motor, the possibility of rotation stop by excessive current can be suppressed.

According to the present invention, reproduction on an optical disc can be continued while the possibility of actuator failure owing to an increase in drive current is being suppressed.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications which fall the ambit of the appended claims.

The invention claimed is:

1. An optical disc device for reproducing or recording information on an optical disc by using laser light, comprising:

an objective lens configured to condense the laser light;
an actuator configured to drive the objective lens;
a detector configured to detect a reflected light from the optical disc;
a focus error signal generating unit configured to generate a focus error signal from the reflected light detected by the detector;
a tracking error signal generating unit configured to generate a tracking error signal from the reflected light detected by the detector;
a control unit configured to generate and output a focus drive signal and a tracking drive signal generated by using the focus error signal and the tracking error signal to control the actuator; and
a signal variation amount measuring unit configured to measure amounts of variation in the focus drive signal and the tracking drive signal,
wherein the control unit is configured to control in such a manner as to change characteristics of at least one of a focus servo control system and a tracking servo control system to suppress the amounts of variation, when the amounts of variation in at least one of the focus drive signal and in the tracking drive signal is equal to or greater than a predetermined amount when the optical disc has been rotated a desired number of rotations.

2. The optical disc device according to claim 1, wherein the control unit is configured to control in such a manner as to change the characteristics after at least one of the focus servo control system and the tracking servo control system are adjusted to a predetermined servo control frequency band.

3. The optical disc device according to claim 1, wherein the control unit is configured to control in such a manner as to change the characteristics in a set-up process after an optical disc is inserted in the optical disc device.

4. An optical disc device for reproducing or recording information on an optical disc by using laser light, comprising:

an objective lens configured to condense the laser light;
an actuator configured to drive the objective lens;
a detector configured to detect a reflected light from the optical disc;
a focus error signal generating unit configured to generate a focus error signal from the reflected light detected by the detector;
a tracking error signal generating unit configured to generate a tracking error signal from the reflected light detected by the detector;
a control unit configured to generate and output a focus drive signal and a tracking drive signal generated by using the focus error signal and the tracking error signal to control the actuator; and
a signal variation amount measuring unit configured to measure amounts of variation in the focus drive signal and the tracking drive signal;
wherein the control unit is configured to control in such a manner as to change characteristics of at least one of a focus servo control system and a tracking servo control system according to the amounts of variation in at least one of the focus drive signal and in the tracking drive signal when the optical disc has been rotated a desired number of rotations; and
wherein the control unit is configured to control in such a manner that when the amount of eccentricity of the optical disc is not greater than a certain amount, the characteristics are changed, and when the amount of eccentricity of the optical disc is greater than the certain amount, the characteristics are not changed.

5. The optical disc device according to claim 1, wherein the control unit is configured to control in such a manner that the characteristics are changed by reducing gain of at least one of the focus drive signal and the tracking drive signal.

6. An optical disc device for reproducing information from an optical disc or recording information on the optical disc by using laser light, comprising:
- an objective lens configured to condense the laser light;
- an actuator configured to drive the objective lens;
- a detector configured to detect a reflected light from the optical disc;
- a focus error signal generating unit configured to generate a focus error signal from the reflected light detected by the detector;
- a tracking error signal generating unit configured to generate a tracking error signal from the reflected light detected by the detector;
- a control unit configured to generate and output a focus drive signal and a tracking drive signal generated by using the focus error signal and the tracking error signal to control the actuator; and
- a signal variation amount measuring unit configured to measure amounts of variation in the focus error signal and the tracking error signal,
- wherein the control unit is configured to control in such a manner as to change characteristics of at least one of a focus servo control system and a tracking servo system to suppress the amounts of variation, when the amounts of variation in at least one of the focus drive signal and in the tracking drive signal is equal to or greater than a predetermined amount.

7. An optical disc device for reproducing information from an optical disc or recording information on the optical disc, by using laser light, comprising:
- a spindle motor configured to rotate an optical disc;
- a control unit configured to output a spindle motor drive signal to control rotation of the spindle motor; and
- a signal variation amount measuring unit configured to measure an amount of the spindle motor drive signal,
- wherein the control unit changes output characteristics of the spindle motor drive signal to suppress the amounts of variation, when the amount of variation of the spindle motor drive signal reaches a predetermined reference level.

8. An optical disc device for reproducing information from an optical disc or recording information on the optical disc or reproducing and recording information on the optical disc by using laser light, comprising:
- an objective lens configured to condense laser light;
- an actuator configured to drive the objective lens;
- a detector configured to detect a reflected light from the optical disc;
- a focus error signal generating unit configured to generate a focus error signal from a reflected light detected by the detector;
- a control unit configured to generate an actuator drive signal, which is configured to serve as a signal to control the actuator, from the focus error signal; and
- a signal variation amount measuring unit configured to measure an amount of variation in the actuator drive signal;
- wherein the control unit is configured to control to reduce a gain of the actuator drive signal, when the amount of variation on the actuator drive signal is equal to or greater than a predetermined amount.

9. An optical disc device for reproducing information from an optical disc or recording information on the optical disc or reproducing and recording information on the optical disc by using laser light, comprising:
- an objective lens configured to condense laser light;
- an actuator configured to drive the objective lens;
- a detector configured to detect a reflected light from the optical disc;
- a tracking error signal generating unit configured to generate a tracking error signal from a reflected light detected by the detector;
- a control unit configured to generate an actuator drive signal, which is configured to serve as a signal to control the actuator, from the tracking error signal; and
- a signal variation amount measuring unit configured to measure an amount of variation in the actuator drive signal;
- wherein the control unit is configured to control to reduce a gain of the actuator drive signal, when the amount of variation on the actuator drive signal is equal to or greater than a predetermined amount.

10. The optical disc device according to claim 1, wherein an amount of variation in at least one of the focus drive signal and the tracking drive signal measured by the signal variation amount measuring unit includes an integral quantity determined in a predetermined interval.

11. The optical disc device according to claim 6, wherein an amount of variation in at least one of the focus drive signal and the tracking drive signal measured by the signal variation amount measuring unit includes an integral quantity determined in a predetermined interval.

12. The optical disc device according to claim 8, wherein an amount of variation in the actuator drive signal measured by the signal variation amount measuring unit includes an integral quantity determined in a predetermined interval.

13. The optical disc device according to claim 9, wherein an amount of variation in the actuator drive signal measured by the signal variation amount measuring unit includes an integral quantity determined in a predetermined interval.

14. An optical disc device for reproducing or recording information on an optical disc by using laser light, comprising:
- an objective lens configured to condense the laser light;
- an actuator configured to drive the objective lens;
- a detector configured to detect a reflected light from the optical disc;
- a focus error signal generating unit configured to generate a focus error signal from the reflected light detected by the detector;
- a tracking error signal generating unit configured to generate a tracking error signal from the reflected light detected by the detector;
- a control unit configured to generate and output a focus drive signal and a tracking drive signal generated by using the focus error signal and the tracking error signal to control the actuator; and
- a signal variation amount measuring unit configured to measure amounts of variation in the focus drive signal and the tracking drive signal;
- wherein the control unit is configured to control in such a manner as to change characteristics of at least one of a focus servo control system and a tracking servo control system according to the amounts of variation in at least one of the focus drive signal and in the tracking drive signal when the optical disc has been rotated a desired number of rotations; and
- wherein an amount of variation in the drive signal measured by the signal variation amount measuring unit is obtained by at least one of: sequentially adding up the absolute values of differences or squared values of differences, integrating the values of differences, or by sequentially adding up or integrating differences between maximum and minimum values of an oscillation of the drive signal.

15. An optical disc device for reproducing information from an optical disc or recording information on the optical disc by using laser light, comprising:
an objective lens configured to condense the laser light;
an actuator configured to drive the objective lens;
a detector configured to detect a reflected light from the optical disc;
a focus error signal generating unit configured to generate a focus error signal from the reflected light detected by the detector;
a tracking error signal generating unit configured to generate a tracking error signal from the reflected light detected by the detector;
a control unit configured to generate and output a focus drive signal and a tracking drive signal generated by using the focus error signal and the tracking error signal to control the actuator; and
a signal variation amount measuring unit configured to measure amounts of variation in the focus error signal and the tracking error signal;
wherein the control unit is configured to control in such a manner as to change characteristics of at least one of a focus servo control system and a tracking servo system according to the amounts of variation in at least one of the focus drive signal and in the tracking drive signal; and
wherein an amount of variation in the drive signal measured by the signal variation amount measuring unit is obtained by at least one of: sequentially adding up the absolute values of differences or squared values of differences, integrating the values of differences, or by sequentially adding up or integrating differences between maximum and minimum values of an oscillation of the drive signal.

16. An optical disc device for reproducing information from an optical disc or recording information on the optical disc or reproducing and recording information on the optical disc by using laser light, comprising:
an objective lens configured to condense laser light;
an actuator configured to drive the objective lens;
a detector configured to detect a reflected light from the optical disc;
a focus error signal generating unit configured to generate a focus error signal from a reflected light detected by the detector;
a control unit configured to generate an actuator drive signal, which is configured to serve as a signal to control the actuator, from the focus error signal; and
a signal variation amount measuring unit configured to measure an amount of variation in the actuator drive signal;
wherein the control unit is configured to control to reduce a gain of the actuator drive signal, when the amount of variation on the actuator drive signal is equal to or greater than a predetermined amount; and
wherein an amount of variation in the drive signal measured by the signal variation amount measuring unit is obtained by at least one of: sequentially adding up the absolute values of differences or squared values of differences, integrating the values of differences, or by sequentially adding up or integrating differences between maximum and minimum values of an oscillation of the drive signal.

17. An optical disc device for reproducing information from an optical disc or recording information on the optical disc or reproducing and recording information on the optical disc by using laser light, comprising:
an objective lens configured to condense laser light;
an actuator configured to drive the objective lens;
a detector configured to detect a reflected light from the optical disc;
a tracking error signal generating unit configured to generate a tracking error signal from a reflected light detected by the detector;
a control unit configured to generate an actuator drive signal, which is configured to serve as a signal to control the actuator, from the tracking error signal; and
a signal variation amount measuring unit configured to measure an amount of variation in the actuator drive signal;
wherein the control unit is configured to control to reduce a gain of the actuator drive signal, when the amount of variation on the actuator drive signal is equal to or greater than a predetermined amount; and
wherein an amount of variation in the drive signal measured by the signal variation amount measuring unit is obtained by at least one of: sequentially adding up the absolute values of differences or squared values of differences, integrating the values of differences, or by sequentially adding up or integrating differences between maximum and minimum values of an oscillation of the drive signal.

18. The optical disc device of claim 7, for reproducing information from an optical disc or recording information on the optical disc, by using laser light,
wherein the predetermined reference level is designated as predetermined reference level SH0.

* * * * *